United States Patent Office

Re. 27,999
Reissued Apr. 30, 1974

27,999
ELECTROPLATING BATH FOR DEPOSITING BRIGHT ZINC PLATES

Joachim Korpiun and Joachim Steeg, Geislingen an der Steige, Germany, assignors to Dr. Ing. Max Schloetter Fabrik fuer Galvanotechnik, Geislingen an der Steige, Germany No Drawing. Original No. 3,694,330, dated Sept. 26, 1972, Ser. No. 640,512, May 23, 1967. Application for reissue Apr. 25, 1973, Ser. No. 354,456
Claims priority, application Germany, May 28, 1966, P 15 21 029.4
Int. Cl. C23b *5/12, 5/46*
U.S. Cl. 204—55 R 20 Claims

Matter enclosed in heavy brackets [ ] appears in the original patent but forms no part of this reissue specification; matter printed in italics indicates the additions made by reissue.

ABSTRACT OF THE DISCLOSURE

Semi-bright to fully bright zinc deposits are produced by electroplating articles in an acid electroplating bath containing a non-complex zinc salt and, as brightening and the throwing power increasing additives, an aromatic carbonyl compound, a non-ionogenic, surface active polyoxyethylene compound, and/or a compound selected from the group consisting of ammonium chloride and a compound forming a soluble complex compound with zinc salts within the pH-range between about 2.5 and about 5.5.

Electroplating with such baths is preferably effected at a pH between about 2.5 and about 5.5, a temperature between about 10° C. and about 30° C., and a current density between about 1 amp/sq. dm. and about 5 amp/sq. dm.

The baths are able to replace the heretofore used alkaline electroplating zinc baths and are substantially free of the disadvantages of said baths, especially the difficulties encountered in waste disposal.

The present invention relates to an acid galvanic electroplating zinc solution or bath and more particularly to an acid zinc bath for depositing semi-bright or fully bright zinc plates or coatings, to an electroplating process by means of such an acid zinc bath, and to zinc coated articles obtained by electroplating in such a bath.

Technically useful zinc electrolytes for the hardware industry must permit precipitation of bright zinc deposits within a wide range of current densities. In addition thereto they must have a high throwing power so that satisfactory zinc deposits are obtained even at recessed areas of the surface to be electroplated. Baths which contain alkali cyanides or alkaline zinc baths which are free of cyanide meet these requirements in most instances. However, considerable difficulties are encountered in detoxifying the used electrolyte baths.

Acid zinc baths which operate within the pH-range of 2.0 to 6.0, do not cause such difficulties. Drag-outs of the baths into rinsing water obtained on electroplating with such acid zinc baths are simply neutralized and thereby rendered harmless so that they meet the existing regulations. The zinc baths which are known at present, however, are rather unsatisfactory with respect to the brightness of the zinc deposits and their throwing power.

It has been suggested to add aromatic aldehydes together with sulfurous acid or, respectively, sulfites and colloids to solutions of zinc sulfate and to use such electrolytes for deposing bright zinc coatings or plates. Such baths, in fact, yield semi-bright to fully bright deposits but only within a rather narrow range of current densities. However, said deposits tend to yield pitted zinc coatings or plates. The throwing power of such baths is also quite low and corresponds to that of the acid zinc baths which are known for a long time and which yield matte zinc deposits. Therefore, such acid zinc baths have not been used in the hardware industry.

Thus all attempts to provide acid zinc baths with a satisfactory brightness and throwing power of the zinc precipitation have failed heretofore.

It is now an important object of the present invention to provide an acid electroplating zinc bath which yields not only fully bright zinc deposits, i.e. plates over a wide range of current densities but the throwing power of which approximates that of alkaline electroplating zinc baths.

Another object of the present invention is to provide a simple and effective electroplating process whereby bright to fully bright zinc deposits are obtained under economic conditions.

Still another object of the present invention are zinc electroplated articles of bright appearance which articles are obtained by electroplating in an acid electroplating bath of a specific composition to produce bright zinc deposits.

Other objects of the present invention and advantageous features thereof will become apparent as the description proceeds.

In principle the acid electroplating bath for depositing semi-bright to fully bright zinc plates according to the present invention comprises an aqueous solution of zinc salts, especially of simple, i.e., not complex inorganic zinc salts and preferably of zinc sulfate, zinc chloride, or zinc fluoborate, zinc acetate, and others, to which the following agents are added:

(1) An aromatic carbonyl compound.
(2) A non-ionogenic, surface active polyoxy ethylene compound.
(3) Ammonium chloride and/or a compound capable of forming soluble complex salts with zinc salts.

Suitable aromatic carbonyl compounds are carboxylic acids, carboxylic acid esters, aldehydes, or ketones, such as benzoic acid, cinnamic acid, salicylic acid, phenyl propiolic acid, benzoyl acetic acid, o-cumaric acid, cinnamic aldehyde, m-hydroxy benzaldehyde, acetophenone, benzophenone, benzoyl acetic acid ethyl ester, and others. These carbonyl compounds are highly effective when added to the electrolyte in an amount between about 0.1 g./l. and about 20 g./l. Thereby the amounts may vary within the limits of ±25% without any harmful effect.

Useful carbonyl compounds are preferably soluble in water to an amount of 0.1 g./l. Carbonyl compounds of a lower solubility are in general not sufficiently effective.

There is a great choice of non-ionogenic, surface active polyoxyethylene compounds so that a large number of such compounds are available for addition to the zinc bath. The preferred compounds are those in which at least six ethylene oxide molecules are condensed with long-chain fatty alcohols, long-chain fatty acids, long-chain fatty amines, or long-chain alkyl phenols. The term "long-chain" indicates molecules which contain at least 6 carbon atoms. Frequently it is advisable to select compounds with 10 or more oxyethylene groups in the molecule so as to provide good water solubility.

The third additive component of the bath composition according to the present invention is ammonium chloride and/or a compound capable of forming soluble complex compounds with zinc. The most effective concentration of ammonium chloride is between about 5 g./l. and about 60 g./l. Complex-forming compounds exhibit the desired favorable effect when added in amounts between about 2 g./l. and about 30 g./l. In place of ammonium chloride, there may be added and used another ammonium salt such as ammonium sulfate, ammonium acetate, and others provided a sufficient amount of another chloride, such as zinc chloride or sodium chloride is added to the bath at the same time.

In place of ammonium chloride, there may be used, as stated above, compounds which are capable of forming soluble complex salts with zinc ions. Such compounds are, for instance, sodium glycerophosphate, triethanolamine, ethylene diamine, or the sodium salt of ethylene diamine tetraacetic acid, and others. Ammonium chloride and the complex-forming compounds can readily be exchanged against each other. They can also be used together in the bath.

Although, as will be shown in the examples given hereinafter, the complex-forming compounds are added in relatively small amounts, in order to produce semi-bright to fully bright zinc deposits, it is necessary, especially if the zinc content of the used baths and rinsing water must meet very high requirements, to determine by tests whether the zinc content of the bath, when it is diluted to the concentration of the sewer, can be decreased sufficiently by neutralization to a pH of 7.5 to 8.0. While thus the use of complex-forming compounds requires careful superivsion of the used baths and rinsing waters, the zinc content of waste baths containing ammonium chloride as third component is slways below the admissible limit if the neutralization step is properly carried out.

The brightness of the zinc deposits, the range of current densities within which semi-bright to fully bright zinc coatings or plates are obtained, and the throwing power of the bath are improved by the combined use of the three additive components according to the present invention to such an extent that such acid zinc baths can successfully be used for technical electroplating in competition with the heretofore employed alkaline bright zinc baths.

Preferably the zinc baths according to the present invention are operated at a pH between about 2.5 and about 5.5. Higher pH-values may cause precipitation of basic zinc salts. At a lower pH-value the zinc anodes are dissolved in the electro without passing current therethrough. As a result of such a dissolution of the zinc anode an undesirable increase in the zinc concentration in the bath takes place.

Bright zinc deposits or plates obtained by using electroplating baths according to the present invention can be subjected to a postplating treatment whereby they are provided with chromate conversion coatings which convert the zinc surface from the naturally occurring oxide to the one containing hexavalent chromium. Chromate conversion coatings may be colorless or may impart various colors to the zinc deposits such as bluish, brown or olive. The brightness of the zinc deposit is even enhanced especially by colorless or bluish chromate treatment.

The following examples serve to illustrate bright electroplating zinc baths according to the present invention. Semi-bright to fully bright zinc coatings are deposited from such baths at current densities between about 1 amp./sq. dm. and about 5 amp./sq. dm. and a bath temperature between about 15° C. and about 30° C. The baths have a throwing power which is good enough to employ them for zinc plating of technical articles in place of alkaline zinc electroplating baths. Even higher current densities may be employed when vigorously agitating the electrolyte or the work.

EXAMPLE 1

One liter of electroplating bath contains 300 g. of zinc sulfate,
25 g. of ammonium chloride,
0.6 g. of cinnamic acid, and
3.0 g. of the surface active compound from isononyl alcohol and ethylene oxide with about 15 ($C_2H_4O$)-groups in its molecule.

pH of the bath: 4.5.

EXAMPLE 2

One liter of electroplating bath contains 225 g. of zinc sulfate,
30 g. of zinc chloride,
25 g. of ammonium sulfate,
6 g. of benzoic acid, and
5 g. of the surface active compound from nonyl phenol and ethylene oxide with about 30 ($C_2H_4O$)-groups in its molecule.

pH of the bath: 5.0.

EXAMPLE 3

One liter of electroplating bath contains 200 g. zinc acetate,
25 g. of ammonium chloride,
0.5 g. of phenyl propiolic acid, and
4 g. of the surface active compound from stearylamine and ethylene oxide with about 25 ($C_2H_4O$)-groups in its molecule.

pH of the bath: 5.0.

EXAMPLE 4

One liter of electroplating bath contains 250 g. of zinc sulfate,
35 g. of ammonium chloride,
0.25 g. of benzal acetone, and
4.5 g. of the surface active compound from tributyl phenol and ethylene oxide with about 50 ($C_2H_4O$)-groups in its molecule.

pH of the bath: 3.0.

EXAMPLE 5

One liter of electroplating bath contains 325 g. of zinc sulfate,
4 g. of ethylene diamine hydrate,
0.15 g. of benzal acetone, and
3 g. of the surface active compound from oleyl alcohol and ethylene oxide with about 15 ($C_2H_4O$)-groups in its molecule.

pH of the bath: 3.5.

EXAMPLE 6

One liter of electroplating bath contains 175 g. of zinc acetate,
40 g. of ammonium chloride,
0.3 g. of benzophenone, and
3 g. of the surface active compound from coconut fatty acids and ethylene oxide with about 20 ($C_2H_4O$)-groups in its molecule.

pH of the bath: 4.0.

EXAMPLE 7

One liter of electroplating bath contains 350 g. of zinc sulfate,
10 g. of sodium glycerophosphate,
0.3 g. of cinnamic aldehyde, and
5 g. of the surface active compound from nonyl phenol and ethylene oxide with about 15 ($C_2H_4O$)-groups in its molecule.

pH of the bath: 4.2.

EXAMPLE 8

One liter of electroplating bath contains 290 g. of zinc sulfate,
25 g. of ammonium chloride,
0.25 g. of m-hydroxy benzaldehyde, and
3 g. of the surface active compound from hexanol and ethylene oxide with about 15 ($C_2H_4O$)-groups in its molecule.

pH of the bath: 3.7.

EXAMPLE 9

One liter of electroplating bath contains 175 g. of zinc sulfate,
30 g. of zinc chloride,
30 g. of ammonium sulfate,
0.4 g. of benzoyl acetic acid ethyl ester, and
10 g. of the surface active compound from isononyl alcohol and ethylene oxide with about 15 $(C_2H_4O)$-groups in its molecule.

pH of the bath: 4.5.

EXAMPLE 10

One liter of electroplating bath contains 125 g. of zinc chloride,
25 g. of ammonium chloride,
0.5 g. of benzal acetone, and
10 g. of the surface active compound from isonoyl alcohol and ethylene oxide with about 15 $(C_2H_4O)$-groups in its molecule.

EXAMPLE 11

One liter of electroplating bath contains 275 g. of zinc sulfate,
10 g. of triethanolamine,
0.6 g. of m-hydroxy benzaldehyde, and
4 g. of the surface active compound from nonyl phenol and ethylene oxide with about 11 $(C_2H_4O)$-groups in its molecule.

EXAMPLE 12

One liter of electroplating bath contains 220 g. of zinc acetate,
16 g. of the disodium salt of ethylene diamine tetraacetic acid,
0.15 g. of benzal acetone, and
3 g. of the surface active compound from oleyl alcohol and ethylene oxide with about 20 $(C_2H_4O)$-groups in its molecule.

All these electroplating baths yield at the current densities and bath temperatures as given herein-above fully bright zinc deposits. The throwing power of the baths is highly satisfactory.

Of course, many changes and variations in the aromatic carbonyl compound, the non-ionogenic, surface active polyoxyethylene compound, and the compound forming a complex compound with zinc ions, in the amounts of the bath components and additives thereto, in the pH-value of the baths, in the current densities and bath temperatures during electroplating, and the like may be made by those skilled in the art in accordance with the principles set forth therein and in the claims annexed hereto.

We claim:

1. Acid electroplating bath for depositing semi-bright to fully bright zinc plates comprising an aqueous solution, having a pH between about 2.5 and about 5.5, of a zinc salt; an aromatic carbonyl compound; a non-ionogenic, surface active polyoxyethylene compound; and a compound selected from the group consisting of ammonium chloride and the complex-forming compounds sodium glycerophosphate, triethanolamine, ethylene diamine, and the sodium salts of ethylene diamine tetraacetic acid; said aromatic carbonyl compound being present in the bath in an amount between about 0.1 g./l. and about 20 g./l.; said non-ionogenic, surface active polyoxyethylene compound being a compound produced by condensing ethylene oxide with compounds selected from the group consisting of long-chain fatty alcohols, long chain fatty acids, long-chain fatty amines, and long-chain alkyl phenols, and being present in the bath in an amount of at least 0.5 g./l.; said ammonium chloride being present in the bath in an amount of at least 5 g./l.; and the amount of the complex-forming compound in the bath being at least 2 g./l.

2. The acid electroplating bath according to claim 1, wherein the non-ionogenic, surface active polyoxyethylene compound is a condensation product of ethylene oxide with a compound selected from the group consisting of long-chain fatty alcohols, long-chain fatty acids, long-chain fatty amines, and phenols substituted by a long-chain alkyl radical, said condensation product having at least 6 ethylene oxide groups in its molecule, the long-chain alkyl radical in said fatty alcohols, fatty acids, fatty amines, and alkyl phenols having at least 6 carbon atoms.

3. The acid electroplating bath according to claim 2, wherein the condensation product has at least 10 ethylene oxide groups in its molecule.

4. The acid electroplating bath according to claim 1, wherein the surface active polyoxyethylene compound is present in the bath in an amount between about 0.5 g./l. and about 20 g./l.

5. The acid electroplating bath according to claim 1, wherein ammonium chloride is present in the bath in an amount between about 5 g./l. and about 60 g./l.

6. The acid electroplating bath according to claim 1, wherein the compound forming a soluble complex compound with zinc salts is present in the bath in an amount between about 2 g./l. and about 30 g./l.

7. The acid electroplating bath according to claim 1, wherein the aromatic carbonyl compound is present in the bath in an amount between about 0.1 g./l. and about 20 g./l., the surface active polyoxyethylene compound in an amount between about 0.5 g./l. and about 20 g./l., and ammonium chloride in an amount between about 5 g./l. and about 60 g./l.

8. The acid electroplating bath according to claim 1, wherein the aromatic carbonyl compound is present in the bath in an amount between about 0.1 g./l. and about 20 g./l., the surface active polyoxyethylene compound in an amount between about 0.5 g./l. and about 20 g./l., and the compound forming a soluble complex compound with zinc salts in an amount between about 2 g./l. and about 30 g./l.

9. The acid electroplating bath according to claim 1, wherein the aromatic carbonyl compound is selected from the group consisting of an aromatic carboxylic acid, an aromatic aldehyde, and an aromatic ketone.

10. The acid electroplating bath according to claim 1, wherein the zinc salt is selected from the group consisting of zinc sulfate, zinc chloride, zinc acetate, and zinc fluoborate.

11. The acid electroplating bath according to claim 1, wherein the zinc salt is selected from the group consisting of zinc sulfate, zinc acetate, and zinc chloride, the aromatic carbonyl compound is selected from the group consisting of cinnamic acid, benzoic acid, phenyl propiolic acid, benzal acetone, benzophenone, cinnamic aldehyde, m-hydroxy benzaldehyde, and benzoyl acetic acid ethyl ester, and the polyoxy ethylene compound is selected from the group consisting of the condensation product of ethylene oxide with isononyl alcohol, oleyl alcohol, hexanol, coconut fatty acids, stearylamine, nonyl phenol, and tributyl phenol, and the complex forming compound is selected from the group consisting of ethylene diamine, triethanolamine, sodium glycerophosphate, and the disodium salt of ethylene diamine tetraacetic acid.

12. The acid electroplating bath according to claim 1, wherein said ammonium chloride is formed by addition of equivalent amounts of an ammonium salt other than ammonium chloride and a soluble metal chloride.

13. An acid aqueous zinc electroplating bath having a pH of about 2.5 to about 5.5, comprising a zinc salt; about 0.1 g./l. to about 20 g./l. of an aromatic carbonyl compound; at least 0.5 g./l. of a compound selected from the group consisting of condensates of long-chain fatty alcohols, long-chain fatty acids, long-chain fatty amines, and long-chain alkyl phenols with ethylene oxide; and a compound selected from the group consisting of ammonium chloride and the complex-forming compounds sodium glycerophosphate, triethanolamine, ethylene diamine, and the sodium salts of ethylene diamine tetraacetic acid; said ammonium chloride being present in the bath in an amount of at least 5 g./l. and the amount of the complex-forming compound in the bath being at least 2 g./l.

14. An acid aqueous zinc electroplating bath having a pH of about 2.5 to 5.5, comprising a zinc salt; about 0.1 g./l. to about 20 g./l. of an aromatic aldehyde; at least 0.5 g./l. of a condensate of a long-chain alkyl phenol with ethylene oxide; and at least 5 g./l. of ammonium chloride.

15. In a process of electroplating articles and depositing thereon a bright zinc deposit; the improvement wherein the article is electroplated as cathode at a pH between about 2.5 and about 5.5 in a zinc bath comprising an aqueous solution of a zinc salt; an aromatic carbonyl compound; a non-ionogenic, surface-active polyoxyethylene compound; and a compound selected from the group consisting of ammonium chloride and the complex-forming compounds sodium glycerophosphate, triethanolamine, ethylene diamine, and the sodium salts of ethylene diamine tetraacetic acid; said aromatic carbonyl compound being present in the bath in an amount between about 0.1 g./l. and about 20 g./l.; said non-ionogenic, surface-active polyoxyethylene compound being a compound produced by condensing ethylene oxide with compounds selected from the group consisting of long-chain fatty alcohols, long-chain fatty acids, long-chain fatty amines, and long-chain alkyl phenols, and being present in the bath in an amount of at least 0.5 g./l.; said ammonium chloride being present in the bath in an amount of at least 5 g./l.; and the amount of the complex-forming compound in the bath being at least 2 g./l.

16. The process according to claim 15, wherein the current density at the cathode is between about 1 amp./sq. dm. and about 4 amp./sq. dm., and the bath temperature is between about 15° C. and about 30° C.

*17. An acid aqueous zinc electroplating bath having a pH from about 2.5 to about 5.5, comprising a zinc salt; about 0.1 to about 20 g./l. of an aromatic carbonyl compound; at least 0.5 g./l. of a polyoxyethylene condensation product containing at least 6 ethylene oxide groups and ammonium chloride or as a complexing agent sodium glycerol phosphate, triethanolamine, ethylene diamine or a salt of ethylene diamine tetracetic acid capable of forming a soluble zinc complex in the bath, said ammonium chloride being present in the bath in an amount of at least 5 g./l. and the complexing agent added to the bath in an amount of at least 2 g./l.*

*18. The acid electroplating bath according to claim 17 in which the aromatic carbonyl compound is an aromatic carboxylic acid, an aromatic aldehyde or an aromatic ketone.*

*19. An acid aqueous zinc electroplating bath having a pH from about 2.5 to about 5.5, comprising a zinc salt; about 0.1 g./l. to about 20 g./l. of an aromatic carbonyl compound; at least 0.5 g./l. of a polyoxyethylene condensation product containing at least 6 ethylene oxide groups, an ammonium salt other than ammonium chloride and a soluble metal chloride each being present in an amount sufficient to produce ammonium chloride in an amount in the bath of at least 5 g./l. or as a complexing agent sodium glycerol phosphate, triethanolamine, ethylene diamine or a salt of ethylene diamine tetracetic acid capable of forming a soluble zinc complex in the bath, said complexing agent added to the bath in an amount of at least 2 g./l.*

*20. A process of electroplating articles with zinc which comprises electroplating the article as a cathode in an acid aqueous zinc electroplating bath having 0.1 g./l. to about 20 g./l. of an aromatic carbonyl compound; at least 0.5 g./l. of a polyoxyethylene condensation product containing at least 6 ethylene oxide groups and ammonium chloride or as a complexing agent sodium glycerol phosphate, triethanolamine, ethylene diamine or a salt of ethylene diamine tetracetic acid capable of forming a soluble zinc complex in the bath, said ammonium chloride being present in the bath in an amount of at least 5 g./l. and the complexing agent added to the bath in an amount of at least 2 g./l. and imparting a current density thereto to effectuate said zinc electroplating.*

References Cited

The following references, cited by the Examiner, are of record in the patented file of this patent or the original patent.

UNITED STATES PATENTS

| | | | |
|---|---|---|---|
| 2,817,627 | 12/1957 | Ostrow et al. | 204—44 |
| 2,828,252 | 3/1958 | Fischer | 204—55 X |
| 2,848,394 | 8/1958 | Foulke et al. | 204—44 X |
| 3,005,759 | 10/1961 | Safranek et al. | 204—55 |
| 3,285,840 | 11/1966 | Lindemann | 204—55 |

GERALD L. KAPLAN, Primary Examiner

UNITED STATES PATENT OFFICE
CERTIFICATE OF CORRECTION

Patent No. Reissue 27,999 Dated April 30, 1974

Inventor(s) Joachim Korpiun and Joachim Steeg

It is certified that error appears in the above-identified patent and that said Letters Patent are hereby corrected as shown below:

Column 1, line 68, "deposing" should read -- depositing --. Column 3, line 24, "slways" should read -- always --. Column 5, line 19, "isonoyl" should read -- isononyl --. Column 7, line 37, "4" should read -- 5 --; line 41, "about 0.1 to about" should read -- about 0.1 g./l --.

Signed and sealed this 17th day of September 1974.

(SEAL)
Attest:

McCOY M. GIBSON JR.
Attesting Officer

C. MARSHALL DANN
Commissioner of Patents